US008697599B2

(12) United States Patent
Benham et al.

(10) Patent No.: US 8,697,599 B2
(45) Date of Patent: *Apr. 15, 2014

(54) METHODS OF PREPARING A POLYMERIZATION CATALYST

(75) Inventors: Elizabeth A. Benham, Spring, TX (US); Max P. McDaniel, Bartlesville, OK (US); Kathy S. Collins, Bartlesville, OK (US); Stephen M. Wharry, Owasso, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/029,309

(22) Filed: Feb. 17, 2011

(65) Prior Publication Data

US 2011/0136996 A1   Jun. 9, 2011

Related U.S. Application Data

(62) Division of application No. 12/406,109, filed on Mar. 17, 2009, now Pat. No. 7,910,669.

(51) Int. Cl.
*B01J 21/00* (2006.01)
*B01J 23/00* (2006.01)
*C08F 110/02* (2006.01)
*C08F 4/24* (2006.01)

(52) U.S. Cl.
USPC ............ 502/319; 502/256; 526/106; 526/352

(58) Field of Classification Search
USPC ......................................... 502/107, 254, 256
See application file for complete search history.

(56) References Cited

U.S. PATENT DOCUMENTS

| | | | |
|---|---|---|---|
| 2,702,288 A | 2/1955 | Hoeksema et al. | |
| 2,963,447 A | 12/1960 | Peters et al. | |
| 3,091,605 A | 5/1963 | Hull et al. | |
| 3,248,179 A | 4/1966 | Norwood | |
| 3,362,946 A * | 1/1968 | Hogan | 526/106 |
| 3,976,632 A | 8/1976 | Delap | |
| 4,151,122 A | 4/1979 | McDaniel et al. | |
| 4,295,999 A * | 10/1981 | Slaugh | 502/242 |
| 4,501,885 A | 2/1985 | Sherk et al. | |
| 4,588,790 A | 5/1986 | Jenkins, III et al. | |
| 4,735,931 A * | 4/1988 | McDaniel et al. | 502/107 |
| 5,071,927 A | 12/1991 | Benham et al. | |
| 5,284,926 A * | 2/1994 | Benham et al. | 526/98 |
| 5,352,749 A | 10/1994 | DeChellis et al. | |
| 5,436,304 A | 7/1995 | Griffin et al. | |
| 5,455,314 A | 10/1995 | Burns et al. | |
| 5,527,867 A * | 6/1996 | Bergmeister | 526/119 |
| 5,565,175 A | 10/1996 | Hottovy et al. | |
| 5,575,979 A | 11/1996 | Hanson | |
| 6,239,235 B1 | 5/2001 | Hottovy et al. | |
| 6,255,413 B1 | 7/2001 | Benham et al. | |
| 6,262,191 B1 | 7/2001 | Hottovy et al. | |
| 6,833,415 B2 | 12/2004 | Kendrick et al. | |
| 6,953,831 B2 * | 10/2005 | Ishihama et al. | 526/352 |
| 7,910,669 B2 * | 3/2011 | Benham et al. | 526/106 |
| 2004/0242811 A1 | 12/2004 | Lin | |

FOREIGN PATENT DOCUMENTS

| | | |
|---|---|---|
| EP | 0457236 A2 | 11/1991 |
| WO | 2005107943 A1 | 11/2005 |
| WO | 2005113146 A1 | 12/2005 |
| WO | 2010107478 A1 | 9/2010 |

OTHER PUBLICATIONS

Foreign communication from a related counterpart application—International Search Report, PCT/US2010/000778, Aug. 2, 2010, 4 pages.

* cited by examiner

*Primary Examiner* — David W Wu
*Assistant Examiner* — Elizabeth Eng
(74) *Attorney, Agent, or Firm* — Rodney B. Carroll; Cherie Huseman; Conley Rose, P.C.

(57) ABSTRACT

A method comprising (a) contacting a support and a chromium-containing compound to form chromium-containing support, (b) heat treating the chromium-containing support in an oxidizing atmosphere to form a treated support, (c) contacting the treated support with carbon monoxide to form a CO-contacted support, and (d) contacting the CO-contacted support with hydrogen to form a catalyst. A method comprising oxidizing a chromium-treated support to form a polymerization catalyst, contacting the polymerization catalyst with carbon monoxide to form a reduced polymerization catalyst, contacting the reduced polymerization catalyst with hydrogen to form an activated polymerization catalyst, and contacting the activated polymerization catalyst with ethylene in a reaction zone under suitable reaction conditions to form a random copolymer. A method comprising reducing a polymerization catalyst comprising Cr(VI) to form a polymerization catalyst comprising Cr(II), and treating the polymerization catalyst comprising Cr(II) with hydrogen.

19 Claims, No Drawings

METHODS OF PREPARING A POLYMERIZATION CATALYST

CROSS-REFERENCE TO RELATED APPLICATIONS

This is a Divisional Application of U.S. patent application Ser. No. 12/406,109 filed Mar. 17, 2009, published as U.S. 2010/0240844 A1, and entitled "Methods of Preparing a Polymerization Catalyst," which application is hereby incorporated by reference herein in its entirety.

STATEMENT REGARDING FEDERALLY SPONSORED RESEARCH OR DEVELOPMENT

Not applicable

REFERENCE TO A MICROFICHE APPENDIX

Not applicable

FIELD

The present disclosure generally relates to polymerization catalysts. More specifically, the present disclosure relates to methods of preparing a chromium supported polymerization catalyst.

BACKGROUND

Polymerization catalysts are known, however methods of producing these catalysts may suffer from a variety of drawbacks. Enhancements in preparation methods for polymerization catalysts can reduce the costs associated with catalyst production and improve process economics. Thus, there is an ongoing need to develop new methods of preparing polymerization catalysts.

SUMMARY

Disclosed herein is a method comprising (a) contacting a support and a chromium-containing compound to form a chromium-containing support, (b) heat treating the chromium-containing support in an oxidizing atmosphere to form a treated support, (c) contacting the treated support with carbon monoxide to form a CO-contacted support, and (d) contacting the CO-contacted support with hydrogen to form a catalyst.

Also disclosed herein is a method comprising oxidizing a chromium-treated support to form a polymerization catalyst, contacting the polymerization catalyst with carbon monoxide to form a reduced polymerization catalyst, contacting the reduced polymerization catalyst with hydrogen to form an activated polymerization catalyst, and contacting the activated polymerization catalyst in the absence of a cocatalyst with ethylene in a reaction zone under suitable reaction conditions to form a random copolymer wherein a comonomer is produced in situ.

Further disclosed herein is a method comprising reducing a polymerization catalyst comprising Cr(VI) to form a polymerization catalyst comprising Cr(II), and treating the polymerization catalyst comprising Cr(II) with hydrogen.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are methods of preparing supported chromium catalysts that have been contacted sequentially with carbon monoxide (CO) followed by hydrogen (H), referred to herein as CO/H catalysts. In an embodiment, a method of preparing a CO/H catalyst comprises contacting a support with one or more chromium-containing compounds to form a chromium-containing support. The chromium-containing support may be heat treated to produce a treated support. The treated support may then be contacted with carbon monoxide (CO) to produce a CO-contacted support. The CO-contacted support may then be contacted with hydrogen to produce a CO/H catalyst, which may be utilized as a polymerization catalyst.

In an embodiment, the CO/H catalyst comprises any suitable support. Examples of suitable supports include without limitation silica, titania, alumina, aluminophosphate, or combinations thereof. The support may have a surface area and pore volume effective to provide for an active CO/H catalyst.

The support may be prepared using any suitable method. For example, an alumina support may be prepared by precipitating sodium aluminate with or without a cation and aluminum to yield an aluminum oxide (also known as boehmite) with a chemical formula of (AlOOH). A silica support may be prepared, for example, by contacting an aqueous solution of an alkali metal silicate with an acid to form a silica hydrogel. The support may also include additional components that do not adversely affect the CO/H catalyst, such as thoria, magnesia, fluoride, silicates, sulfate, phosphate, zirconia, titania, ceria, clay, zeolite, or combinations thereof.

The support may also contain additional metal oxides, such as titania, zirconia, boria, phosphate, and the like. These additional metal oxides may be added by any means known in the art with the aid of this disclosure, such as cogellation or impregnation from an anhydrous or aqueous solvent. In an embodiment, the additional metal oxide may be present in the support in an amount of from about 0 wt. % to about 20 wt % by weight of the support, or from about 1 wt. % to about 10 wt %, or from about 2 wt. % to about 8 wt %.

In an embodiment, the support may be present in the CO/H catalyst in an amount of from about 50 to about 99 percent support by weight (wt. %) of the CO/H catalyst, alternatively from about 75 wt. % to about 99 wt. %, alternatively from about 90 wt. % to about 99 wt. %. Herein the weight percentage of support refers to the final weight percent of support associated with the CO/H catalyst by total weight of the CO/H catalyst after all processing steps.

In an embodiment, the CO/H catalyst comprises chromium. Chromium may be introduced to the CO/H catalyst via contacting one or more of the components of the CO/H catalyst (e.g., the support) with a chromium-containing compound. The chromium-containing compound may be one or more compounds comprising chromium in the hexavalent oxidation state (hereinafter Cr(VI)) or comprising a material suitable for conversion to Cr(VI). In an embodiment, the chromium-containing compound comprises a water-soluble chromium compound; alternatively the chromium-containing compound comprises a hydrocarbon-soluble chromium compound. The chromium-containing compound may be a chromium (II) compound, chromium (III) compound, or combinations thereof. Suitable chromium (III) compounds include, but are not limited to, chromium carboxylates, chromium naphthenates, chromium halides, chromium pyrrolides, chromium benzoates, chromium dionates, chromium nitrates, chromium sulfates, or combinations thereof. Specific chromium (III) compounds include, but are not limited to, chromium (III) isooctanoate, chromium (III) 2,2,6,6-tetramethylheptanedionate, chromium (III) naphthenate, chromium (III) chloride, chromium (III) tris(2-ethylhexanoate), chromic fluoride, chromium (III) oxy-2-ethylhexanoate, chromium (III) dichloroethylhexanoate, chromium (III) acetylacetonate, chromium (III) acetate, chromium (III) butyrate, chromium (III) neopentanoate, chromium (III) laurate, chromium (III) sulfate, chromium (III) oxalate, chromium (III) benzoate, chromium (III) pyrrolide(s), chromium (III) perchlorate, chromium (III) chlorate, or combinations thereof. Suitable chromium (II) compounds include, but are not limited to, chromous fluoride, chromous chloride, chromous bromide, chromous iodide, chromium (II) bis(2-ethylhexanoate), chromium (II) acetate, chromium (II) butyrate, chromium (II) neopentanoate, chromium (II) laurate, chromium (II) stearate, chromium (II) oxalate, chromium (II) benzoate, chromium (II) pyrrolide(s), chromous sulfate, or combinations thereof. Examples of other suitable chromium-containing compounds include tertiary butyl chromate in a hydrocarbon liquid; chromium trioxide in water; chromium acetate in water; chromium nitrate in alcohol; zerovalent organochromium compounds such as pi bonded chromium complexes, for example, dicumene chromium and dibenzene chromium; or combinations thereof. Pi bonded chromium complexes are described in U.S. Pat. No. 3,976,632, which is incorporated by reference herein in its entirety.

The amount of chromium present in the CO/H catalyst may range from about 0.01 wt. % to about 10 wt. % chromium by weight of the CO/H catalyst, alternatively from about 0.2 wt. % to about 5 wt. % chromium, alternatively from about 0.5 wt. % to about 2 wt. % chromium, alternatively about 1% chromium. Herein the weight percentage chromium refers to the final weight percent chromium associated with the catalyst by total weight of the catalyst after all processing steps.

In an embodiment, a method of preparing a CO/H catalyst comprises contacting a support with one or more chromium-containing compounds to form a chromium-containing support. The support and the chromium-containing compound may be of the type previously described herein. The contacting may be carried out using any suitable method, for example, via ion-exchange, incipient wetness, pore fill, aqueous impregnation, organic solvent impregnation, melt coating, co-gelling, and the like. In some embodiments, the support may be precalcined prior to use in the preparation of a CO/H catalyst (e.g., prior to contact with a chromium-containing compound to form the chromium-containing support). For example, the support may be precalcined by heating in the presence of air at a temperature in the range of from about 300° C. to about 1,000° C., or from about 400° C. to about 800° C., or from about 500° C. to about 700° C. for a time of from about 1 minute to about 10 hours, or from about 20 minutes to about 5 hours, or from about 1 hour to about 3 hours. Thereafter, the precalcined support may be contacted with a chromium-containing compound to form a chromium-containing support.

The chromium-containing support may be heat treated to produce a treated support. In an embodiment, the heat treatment is carried out at a temperature ranging from about 400° C. to about 1,000° C., or from about 500° C. to about 800° C., or from about 500° C. to about 750° C., and for a time period of from about 1 minute to about 24 hours, or from about 1 to about 10 hours, or from about 2 to about 8 hours to form a treated support. Heat treatment of the support may be carried out using any suitable method, e.g., fluidization, in an oxidizing atmosphere such as for example in the presence of oxygen or air. Without wishing to be limited by theory, heat treatment of the chromium-containing support may result in an increase in the amount of hexavalent chromium present in the catalyst.

The treated support may then be contacted with carbon monoxide (CO) to produce a CO-contacted support. In an embodiment, the contact with CO is carried out using any suitable method, e.g., fluidization, at a temperature of from about 250° C. to about 750° C., or from about 300° C. to about 600° C., or from about 350° C. to about 500° C., and for a time period of from about 1 minute to about 10 hours, or from about 10 minutes to about 5 hours, or from about 30 minutes to about 2 hours. Without wishing to be limited by theory, contacting the treated support with CO under the disclosed conditions may result in the reduction of Cr(VI) to Cr(II).

The CO-contacted support may then be contacted with hydrogen to produce a CO/H catalyst. In an embodiment, the contact with hydrogen is carried out at a temperature of from about 25° C. to about 750° C., or from about 100° C. to about 500° C., or from about 150° C. to about 350° C., for a time period of from about 1 minute to about 10 hours, or from about 10 minutes to about 5 hours, or from about 30 minutes to about 2 hours, and at a pressure of from about 0.1 bar to about 50 bar, or from about 0.5 bar to about 25 bar, or from about 1 bar to about 3 bar. The resulting material is a CO/H catalyst which may function as a polymerization catalyst when employed in a polymerization reaction system.

In an embodiment, one or more of the steps described previously herein for the preparation of a CO/H catalyst may be carried out in a reactor or reactor system. In an alternative embodiment, one or more of the steps described previously herein for the preparation of a CO/H catalyst may be carried out outside of a reactor or reactor system. In such embodiments, one or more preparation parameters (e.g., contacting the CO-contacted support with hydrogen) may be adjusted to facilitate formation of the CO/H catalyst. For example the CO-contacted support may be treated with hydrogen to produce the CO/H catalyst. Treatment of the CO-contacted support can be done prior to introducing the catalyst into the reactor for example within an activator or any suitable vessel (e.g., a precontacting vessel), or within the reactor. In such an embodiment, the CO-contacted support may be treated with hydrogen at temperatures ranging from about 25° C. to about 500° C., or from about 75° C. to about 350° C., or from about 100° C. to 250° C. Treatment of the CO-contacted support may be carried out under hydrogen pressures ranging from about 0.1 bar to about 50 bar, or from about 0.5 bar to about 25 bar, or from about 1 bar to about 3 bar. Furthermore, treatment of the CO-contacted support with hydrogen may be carried out under the described conditions (i.e., temperature, hydrogen pressure) for a period of time of from about 1 minute to about 24 hours, or from about 10 minutes to about 5 hours, or from about 15 minutes to about 2 hours. After treatment with hydrogen, the hydrogen may be removed from the material and the material flushed clean of hydrogen by any suitable method such as by exposure to a stream of an inert gas for a time period sufficient to remove the hydrogen.

In an embodiment, the CO/H catalyst is a component of a catalytic system comprising a co-catalyst. Generally, the co-catalyst can be any organometallic compound capable of activating and/or enhancing the performance of the catalyst described herein (i.e., the CO/H catalyst) to polymerize olefins. Suitable co-catalysts can include monomeric or oligomeric metal alkyls, metal aryls, metal alkyl-aryls comprising at least one of the metals selected from the group consisting of B, Al, Be, Mg, Ca, Sr, Ba, Li, Na, K, Rb, Cs, Zn, Cd, and Sn. In an embodiment, the co-catalyst comprises a metal alkyl such as for example an alkyl of B, Al, Zn, Li, Na, Mg, or combinations thereof. Alternatively, the co-catalyst comprises a boron alkyl. The metal alkyl can have any number of carbon atoms. However, due to commercial availability and ease of use, the metal alkyl will usually comprise less than about 70 carbon atoms per metal alkyl molecule and alternatively less than about 20 carbon atoms per molecule. In an embodiment, the co-catalyst comprises a boron alkyl comprising a hydrocarbyl group having from about 1 to about 12 carbons. The co-catalyst may be introduced directly to a reaction zone with the CO/H catalyst or may be contacted with the CO/H catalyst prior to form a catalyst mixture that is subsequently introduced to a reaction zone. In an embodiment, the co-catalyst may be present in an amount of from about 0.1 ppm to about 50 ppm, alternatively of from about 1 ppm to about 20 ppm, alternatively of from about 2 ppm to about 10 ppm.

In an alternative embodiment, the CO/H catalyst is a component of a catalytic system lacking a co-catalyst. Such embodiments wherein the CO/H catalyst catalyzes reactions (e.g., polymerization reactions) in the absence of a co-catalyst may result in improvements in the overall process economics when compared to otherwise similar reactions carried out in the presence of a catalyst and a cocatalyst. Cocatalysts, although sometimes useful, can also carry unwanted effects, such as broadening of the molecular weight distribution (MWD), higher long chain branching (LCB), or lowering of the melt index (MI). In an embodiment, the CO/H catalyst allows in-situ comonomer production without the use of a cocatalyst.

The catalysts (i.e., CO/H catalysts) and catalyst systems disclosed herein are intended for any olefin polymerization method which may be carried out using various types of polymerization reactors. As used herein, "polymerization reactor" includes any polymerization reactor capable of polymerizing olefin monomers to produce homopolymers or copolymers. Such homopolymers and copolymers are referred to as resins or polymers.

The various types of reactors include those that may be referred to as batch, slurry, gas-phase, solution, high pressure, tubular or autoclave reactors. Gas phase reactors may comprise fluidized bed reactors or staged horizontal reactors. Slurry reactors may comprise vertical or horizontal loops. High pressure reactors may comprise autoclave or tubular reactors. Reactor types can include batch or continuous processes. Continuous processes could use intermittent or continuous product discharge. Processes may also include partial or full direct recycle of un-reacted monomer, un-reacted co-monomer, and/or diluent.

Polymerization reactor systems of the present disclosure may comprise one type of reactor in a system or multiple reactors of the same or different type. Production of polymers in multiple reactors may include several stages in at least two separate polymerization reactors interconnected by a transfer device making it possible to transfer the polymers resulting from the first polymerization reactor into the second reactor. The desired polymerization conditions in one of the reactors may be different from the operating conditions of the other reactors. Alternatively, polymerization in multiple reactors may include the manual transfer of polymer from one reactor to subsequent reactors for continued polymerization. Multiple reactor systems may include any combination including, but not limited to, multiple loop reactors, multiple gas reactors, a combination of loop and gas reactors, multiple high pressure reactors or a combination of high pressure with loop and/or gas reactors. The multiple reactors may be operated in series or in parallel.

According to one aspect of the disclosure, the polymerization reactor system may comprise at least one loop slurry reactor comprising vertical or horizontal loops. Monomer, diluent, catalyst and optionally any co-monomer may be continuously fed to a loop reactor where polymerization occurs. Generally, continuous processes may comprise the continuous introduction of a monomer, a catalyst, and a diluent into a polymerization reactor and the continuous removal from this reactor of a suspension comprising polymer particles and the diluent. Reactor effluent may be flashed to remove the solid polymer from the liquids that comprise the diluent, monomer and/or co-monomer. Various technologies may be used for this separation step including but not limited to, flashing that may include any combination of heat addition and pressure reduction; separation by cyclonic action in either a cyclone or hydrocyclone; or separation by centrifugation.

A typical slurry polymerization process (also known as the particle form process), is disclosed, for example, in U.S. Pat. Nos. 3,248,179, 4,501,885, 5,565,175, 5,575,979, 6,239,235, 6,262,191, and 6,833,415, each of which is incorporated by reference herein in its entirety.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example is polymerization of propylene monomer as disclosed in U.S. Pat. No. 5,455,314, which is incorporated by reference herein in its entirety.

According to yet another aspect of this disclosure, the polymerization reactor may comprise at least one gas phase reactor. Such systems may employ a continuous recycle stream containing one or more monomers continuously cycled through a fluidized bed in the presence of the catalyst under polymerization conditions. A recycle stream may be withdrawn from the fluidized bed and recycled back into the reactor. Simultaneously, polymer product may be withdrawn from the reactor and new or fresh monomer may be added to replace the polymerized monomer. Such gas phase reactors may comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 5,352,749, 4,588,790, and 5,436,304, each of which is incorporated by reference herein in its entirety.

According to still another aspect of the disclosure, a high pressure polymerization reactor may comprise a tubular reactor or an autoclave reactor. Tubular reactors may have several zones where fresh monomer, initiators, or catalysts are added. Monomer may be entrained in an inert gaseous stream and introduced at one zone of the reactor. Initiators, catalysts, and/or catalyst components may be entrained in a gaseous stream and introduced at another zone of the reactor. The gas streams may be intermixed for polymerization. Heat and pressure may be employed appropriately to obtain optimal polymerization reaction conditions.

According to yet another aspect of the disclosure, the polymerization reactor may comprise a solution polymerization reactor wherein the monomer is contacted with the catalyst composition by suitable stirring or other means. A carrier comprising an inert organic diluent or excess monomer may be employed. If desired, the monomer may be brought in the vapor phase into contact with the catalytic reaction product, in the presence or absence of liquid material. The polymerization zone is maintained at temperatures and pressures that will result in the formation of a solution of the polymer in a reaction medium. Agitation may be employed to obtain better temperature control and to maintain uniform polymerization mixtures throughout the polymerization zone. Adequate means are utilized for dissipating the exothermic heat of polymerization.

Polymerization reactors suitable for the present disclosure may further comprise any combination of at least one raw material feed system, at least one feed system for catalyst or catalyst components, and/or at least one polymer recovery system. Suitable reactor systems for the present disclosure may further comprise systems for feedstock purification, catalyst storage and preparation, extrusion, reactor cooling, polymer recovery, fractionation, recycle, storage, loadout, laboratory analysis, and process control.

Conditions that are controlled for polymerization efficiency and to provide resin properties include temperature, pressure and the concentrations of various reactants. Polymerization temperature can affect catalyst productivity, polymer molecular weight and molecular weight distribution. Suitable polymerization temperature may be any temperature below the de-polymerization temperature according to the Gibbs Free energy equation. Typically this includes from about 60° C. to about 280° C., for example, and from about 70° C. to about 110° C., depending upon the type of polymerization reactor.

Suitable pressures will also vary according to the reactor and polymerization type. The pressure for liquid phase polymerizations in a loop reactor is typically less than 1000 psig. Pressure for gas phase polymerization is usually at about 200 to about 500 psig. High pressure polymerization in tubular or autoclave reactors is generally run at about 20,000 to about 75,000 psig. Polymerization reactors can also be operated in a supercritical region occurring at generally higher temperatures and pressures. Operation above the critical point of a pressure/temperature diagram (supercritical phase) may offer advantages.

The concentration of various reactants can be controlled to produce resins with certain physical and mechanical properties. The proposed end-use product that will be formed by the resin and the method of forming that product determines the desired resin properties. Mechanical properties include tensile, flexural, impact, creep, stress relaxation and hardness tests. Physical properties include density, molecular weight, molecular weight distribution, melting temperature, glass transition temperature, temperature melt of crystallization, density, stereoregularity, crack growth, long chain branching and rheological measurements.

The concentrations of monomer, co-monomer, hydrogen, modifiers, and electron donors are important in producing these resin properties. Co-monomer is used to control product density. Hydrogen can be used to control product molecular weight. Modifiers can be used to control product properties and electron donors affect stereoregularity. In addition, the concentration of poisons is minimized because poisons impact the reactions and product properties. In an embodiment, hydrogen is added to the reactor during polymerization. Alternatively hydrogen is not added to the reactor during polymerization.

The polymer or resin may be formed into various articles, including, but not limited to, bottles, drums, toys, household containers, utensils, film products, drums, fuel tanks, pipes, geomembranes, and liners. Various processes may be used to form these articles, including, but not limited to, blow molding, extrusion molding, rotational molding, injection molding, fiber spinning, thermoforming, cast molding and the like. After polymerization, additives and modifiers can be added to the polymer to provide better processing during manufacturing and for desired properties in the end product. Additives include surface modifiers such as slip agents, antiblocks, tackifiers; antioxidants such as primary and secondary antioxidants; pigments; processing aids such as waxes/oils and fluoroelastomers; and special additives such as fire retardants, antistats, scavengers, absorbers, odor enhancers, and degradation agents.

Catalysts and catalyst systems prepared in accordance with the present disclosure may be used for the polymerization of olefins, for example, alpha-olefins. In an embodiment, a CO/H catalyst or catalyst system is contacted with one or more olefins in a reaction zone under suitable reaction conditions (e.g., temperature, pressure, etc.) to polymerize the olefins. Linear or branched alpha-olefins having 2 to 30 carbon atoms can be used as the olefins raw material. Specific examples of the alpha-olefins may include ethylene, propylene, 1-butene, 1-hexene, 1-octene, 3-methyl-1-butene, 4-methyl-1-pentene, or the like. Such alpha-olefins may be used individually (e.g., to produce homopolymers) or in various combinations of two or more to produce co-polymers (e.g., di-polymers, tri-polymers, etc.). In an embodiment, the CO/H catalyst is used to produce polyethylene, for example polyethylene homopolymer or co-polymer. In various embodiments ethylene is used with one or more co-monomers such as 1-octene, 1-hexene, 1-butene, and the like.

In an embodiment, homopolymers produced by the CO/H catalyst using only ethylene feedstock and without adding 1-hexene to the reactor may have a density of from about 0.935 g/cc to about 0.959 g/cc, alternatively from about 0.950 g/cc to about 0.958 g/cc, or alternatively from about 0.958 g/cc to about 0.95 g/cc. Such polymers may be further characterized by a high load melt index (HLMI) ranging from about 1 g/10 minutes to about 250 g/10 minutes, alternatively from about 5 g/10 minutes to about 250 g/10 minutes, alternatively from about 10 g/10 minutes to about 250 g/10 minutes. The HLMI refers to the rate of flow of a molten polymer resin through an orifice of 0.0825 inches diameter when subjected to a force of 21,600 grams at 190° C., as determined in accordance with ASTM D 1238.

In another embodiment, the CO/H catalyst when contacted with an alpha olefin feedstock consisting essentially of ethylene can make its comonomer in situ, in the absence of cocatalyst, resulting in a copolymer product. In such an embodiment, the copolymer product characteristics are similar to that of a polymer produced with in-situ comonomer systems wherein a cocatalyst is used. For example, molecular weight distribution, long chain branching, and melt index potential of the resulting polymer are similar to a polymer produced with in-situ comonomer systems wherein a cocatalyst is used.

In an embodiment, a CO/H catalyst of the type described herein is used to produce a copolymer product in the absence of an external addition of a comonomer. Without wishing to be limited by theory, it is the pretreatment of Cr(II) with $H_2$ prior to contact with monomer that produces a CO/H catalyst as disclosed herein that can then both oligomerize and polymerize an olefin to result in a copolymer product.

In yet another embodiment, the CO/H catalyst may also be used to produce a random copolymer (RCP) of ethylene and comonomer, by externally adding additional comonomer, such as 1-hexene, to the reactor. The RCP may have a density of from about 0.92 g/cc to about 0.96 g/cc, alternatively from about 0.93 g/cc to about 0.96 g/cc, alternatively from about 0.94 g/cc to about 0.955 g/cc.

In such an embodiment, the co-monomer (e.g., 1-hexene) may be present in the RCP in an amount of from about 0.1 weight percent (wt. %) to about 15 wt. % based on the total weight of the RCP, alternatively from about 0.5 wt. % to about 10 wt. %, alternatively from about 1 wt. % to about 5 wt. %.

In an embodiment, the CO/H catalyst may be used to produce a product comprising an olefin trimer. In some embodiments, the CO/H catalyst is used to produce a reactor effluent comprising an ethylene trimer (hexene). In other embodiments, the CO/H catalyst produces a reactor effluent comprising 1-hexene. In yet other embodiments, the CO/H catalyst is used to produce a reactor effluent enriched in 1-hexene. In other embodiments, the CO/H catalyst is used to produce a reactor effluent wherein 1-hexene is the majority component.

In an embodiment, a CO/H catalyst of the type described herein when used as a polymerization catalyst displays a product yield comparable to that of a catalyst system comprising an otherwise similar catalyst and a cocatalyst. In an embodiment, the CO/H catalyst has a product yield of from about 500 grams polymer/gram catalyst (g/g) to about 10,000 g/g, alternatively from about 1000 g/g to about 5000 g/g, alternatively from about 2000 g/g to about 4000 g/g and a polymerization activity of from about 1000 grams polymer per gram catalyst per hour (g/g-h) to about 5000 g/g-h, alternatively from about 1500 g/g-h to about 5000 g/g-h, alternatively from about 2000 g/g-h to about 5000 g/g-h.

A CO/H catalyst of the type described herein when employed as a polymerization catalyst may produce its own comonomer. In an embodiment, an RCP is prepared from ethylene using a CO/H catalyst of the type described herein in the absence of a co-catalyst. Further, the RCP comonomer may comprise 1-hexene, alternatively the comonomer consists essentially of 1-hexene. In such an embodiment, the resulting RCP may have a narrower molecular weight distribution (MWD) when compared to a polymer produced using a catalyst system comprising an otherwise similar catalyst and a cocatalyst. The resulting RCP may display decreased long chain branching (LCB) when compared to one produced using an otherwise similar polymerization catalyst and a cocatalyst. The RCP produced using a CO/H catalyst of the type described herein may improve and/or eliminate drawbacks associated with wax and/or smoke that are typically present during production of an RCP produced with comparable to that of a catalyst system comprising an otherwise similar catalyst and a cocatalyst.

EXAMPLES

The embodiments having been generally described, the following examples are given as particular embodiments of the disclosure and to demonstrate the practice and advantages thereof. It is understood that the examples are given by way of illustration and are not intended to limit the specification or the claims in any manner.

Example 1

The performance of a Cr-supported catalyst in ethylene polymerization was investigated. Seven samples, designated Samples 1-7, were prepared using 969 MPI, which is a silica supported Cr catalyst commercially available from W. R. Grace having a surface area of 300 $m^2/g$, a pore volume of 1.6 mL/g, and an average particle size of about 100 microns. Samples 1-6 were heat treated by fluidization in dry air for 3 hours at 800° C. and then reduced by fluidization in dry CO at 350° C. for half an hour. Samples 1, 3, and 5 were then tested for polymerization behavior in a bench reactor at 100° C. respectively with 550 psi ethylene for 1 hour. Samples 2 and 4 were treated with hydrogen (i.e., treated with hydrogen after having been previously treated with carbon monoxide) and then tested in a bench reactor at 100° C. respectively with 550 psi ethylene for polymerization behavior. Sample 6 was also treated with hydrogen (i.e., subsequent to CO treatment) and then tested in a bench reactor at 105° C. respectively with 550 psi ethylene or 1 hour for polymerization behavior. Sample 7 was heat treated at 800° C., reduced in $H_2$ at 350° C. for half an hour (i.e., without having been previously treated with CO), and tested for polymerization behavior in a similar bench reactor at similar conditions described above. Polymerization runs lasted until the reactor filled with polymer, e.g., from about 24 to about 70 minutes. For Sample 6, hydrogen was also added to the reactor. The polyethylene yields, reaction times, polymerization activities, HLMIs, and densities resulted from each samples were recorded and the results are tabulated in Table 1.

TABLE 1

| Sample | Processing* | Press. And Temp of $H_2$ Treatment | Reaction condition | # Catalyst charged | PE yield (g) | Reaction time (min) | Activity (g/g-h) | HLMI (g/10 min.) | Density (g/cc) |
|---|---|---|---|---|---|---|---|---|---|
| 1 | 800° C., 350° C. CO | None | 100° C. | 0.2107 | 134 | 30 | 1272 | 6.1 | 0.9630 |
| 2 | 800° C., 350° C. CO | 315 psi 105° C., 1 h | 100° C. | 0.3369 | 219 | 32 | 1219 | 5.9 | 0.9596 |
| 3 | 800° C., 350° C. CO | 8 psi 250° C., 0.5 h | 100° C. | 0.1268 | 80 | 70 | 541 | 11.3 | 0.9540 |
| 4 | 800° C., 350° C. CO | 8 psi 250° C., 0.5 h | 100° C. | 0.4033 | 271 | 40 | 1008 | 14.5 | 0.9497 |
| 5 | 800° C., 350° C. CO | 8 psi 350° C., 0.5 h | 100° C. | 0.2282 | 250 | 43 | 1529 | 8.0 | 0.9597 |
| 6 | 800° C., 350° C. CO | 315 psi 105° C., 1 h | 105° C., 18 psi $H_2$ | 0.5740 | 232 | 24 | 1010 | 74.5 | 0.9588 |
| 7 | 800° C., | 15 psi | 100° C. | 0.7523 | 43 | 87 | 39 | 5.3 | 0.9601 |

TABLE 1-continued

| Sample | Processing* | Press. And Temp of $H_2$ Treatment | Reaction condition | # Catalyst charged | PE yield (g) | Reaction time (min) | Activity (g/g-h) | HLMI (g/10 min.) | Density (g/cc) |
|---|---|---|---|---|---|---|---|---|---|
| | 350° C. $H_2$ | 350° C. | | | | | | | |

*Processing refers to all steps used to produce the final catalyst including heat treatment, CO treatment, and $H_2$ treatment The results showed that the densities for Samples 2-6 that were preheated in hydrogen decreased when compared to Sample 1. The reaction conditions at 250° C. appeared to be near the optimum temperature for hydrogen treatment, as shown by Sample 3 and 4. Adding hydrogen to the reactor showed little or no additional effect, as shown by Sample 5. In addition, simply reducing the catalyst in hydrogen and omitting the CO reduction step resulted in a poor catalyst with low PE yield, low activity, high density, and low HLMI, as shown by Sample 7.

Next, the resulting polymers from Samples 2 and 6 were analyzed by C-13 NMR to determine the amount of hexene co-monomer in the polymer. The weight percentage of 1-octene, 1-hexene, 1-butene, and relative monomer dispersity (RMD) were recorded and the results are tabulated in Table 2.

TABLE 2

| | Weight % co-monomer | | | |
|---|---|---|---|---|
| Sample | 1-Octene | 1-Hexene | 1-Butene | RMD |
| 2 | 0.11% | 0.13% | 0.16% | 100.20% |
| 6 | 0.33% | 0.61% | 0.44% | 100.70% |

The results demonstrated that 1-hexene was the primary product produced in situ in the reactor and incorporated into the polymer. In addition, both polymers had RMDs of greater than 100%, which indicates a homogeneous distribution of branching.

While embodiments of the disclosure have been shown and described, modifications thereof can be made without departing from the spirit and teachings of the disclosure. The embodiments described herein are exemplary only, and are not intended to be limiting. Many variations and modifications of the disclosure disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, ..., 50 percent, 51 percent, 52 percent, ..., 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference is not an admission that it is prior art to the present disclosure, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method comprising:
    (a) contacting a support and a chromium-containing compound to form a chromium-containing support;
    (b) heat treating the chromium-containing support in an oxidizing atmosphere to form a treated support;
    (c) contacting the treated support with carbon monoxide to form a CO-contacted support; and
    (d) contacting, outside of a reactor, the CO-contacted support with hydrogen to form a catalyst.

2. The method of claim 1, wherein the support comprises silica, titania, zirconia, boria, phosphate, alumina, alumina-phosphate, or combinations thereof.

3. The method of claim 1, wherein the support is present in the catalyst in an amount of from about 50 wt. % to about 99 wt. % by final weight of the catalyst.

4. The method of claim 1, wherein the chromium-containing compound comprises a water-soluble chromium compound, a hydrocarbon-soluble chromium compound, a chromium (II) compound, chromium (III) compound, or combinations thereof.

5. The method of claim 1, wherein chromium is present in the catalyst in an amount of from about 0.01 wt. % to about 10 wt.% by final weight of the catalyst.

6. The method of claim 1, wherein the heat treating comprises heating at a temperature of from about 400° C. to about 1000° C. for a time period of from about 1 minute to about 24 hours.

7. The method of claim 1, wherein the heat treating occurs in the presence of oxygen, air or combinations thereof.

8. The method of claim 1, wherein the contacting with carbon monoxide occurs at a temperature of from about 250° C. to about 750° C. for a time period of from about 1 minute to about 10 hours.

9. The method of claim 1, wherein the contacting with hydrogen occurs at a temperature of from about 25° C. to about 750° C. for a time period of from about 1 minute to about 10 hours, and at a pressure of from about 0.1 bar to about 50 bar.

10. The method of claim 1, wherein the catalyst has a polymerization activity of from about 1000 μg-h to about 5000 g/g-h.

11. The method of claim 1, further comprising contacting the catalyst with one or more olefin monomers in a reaction zone to form a polymer and recovering the polymer from the reaction zone.

12. The method of claim 11, wherein the olefin monomers comprise ethylene and the polymer comprises an ethylene homopolymer; the olefin monomers comprise ethylene and another alpha olefin monomer and the polymer comprises an ethylene copolymer; or combinations thereof.

13. The method of claim 11, wherein the polymer has an HLMI of from about 1 g/10 minutes to about 250 g/10 minutes.

14. The method of claim 11, wherein the polymer has a yield of from about 500 g/g to about 10000 g/g.

15. The method of claim 11, wherein the polymer has a density of from about 0.920 g/cc to about 0.96 c/c.

16. The method of claim 1, wherein steps (a), (b), (c), or combinations thereof are performed outside of a reactor.

17. A method comprising:
 reducing a polymerization catalyst comprising Cr(VI) to form a polymerization catalyst comprising Cr(R); and
 treating, outside of a reactor, the polymerization catalyst comprising Cr(II) with hydrogen.

18. The method of claim 1, further comprising contacting the catalyst with a feedstock consisting essentially of ethylene and recovering a polymeric composition having a density of from about 0.935 g/cc to about 0.958 c/c.

19. The method of claim 17, further comprising contacting the polymerization catalyst with monomer and forming a polymer.

* * * * *